(12) United States Patent
Fukaya

(10) Patent No.: US 10,117,184 B2
(45) Date of Patent: Oct. 30, 2018

(54) POWER SUPPLYING APPARATUS CAPABLE OF EXECUTING WIRELESS POWER SUPPLY TO POWER RECEIVING APPARATUS AND WIRELESS COMMUNICATION WITH THE SAME

(71) Applicant: CANON KABUSHIKI KAISHA, Tokyo (JP)

(72) Inventor: Yudai Fukaya, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 55 days.

(21) Appl. No.: 15/297,690

(22) Filed: Oct. 19, 2016

(65) Prior Publication Data
US 2017/0118712 A1 Apr. 27, 2017

(30) Foreign Application Priority Data
Oct. 23, 2015 (JP) ................... 2015-208836

(51) Int. Cl.
*H04W 52/02* (2009.01)
*H04W 24/08* (2009.01)

(52) U.S. Cl.
CPC ....... *H04W 52/0235* (2013.01); *H04W 24/08* (2013.01); *H04W 52/0261* (2013.01)

(58) Field of Classification Search
CPC ............. H04W 24/08; H04W 52/0235; H04W 52/0261
See application file for complete search history.

(56) References Cited

U.S. PATENT DOCUMENTS

| | | | | |
|---|---|---|---|---|
| 6,184,651 | B1* | 2/2001 | Fernandez | H02J 7/025 320/108 |
| 2006/0113955 | A1* | 6/2006 | Nunally | H02J 7/025 320/108 |
| 2009/0284082 | A1* | 11/2009 | Mohammadian | G06K 7/0008 307/104 |
| 2010/0151808 | A1* | 6/2010 | Toncich | H02J 7/025 455/226.3 |
| 2010/0213895 | A1* | 8/2010 | Keating | H02J 7/02 320/108 |
| 2010/0279606 | A1* | 11/2010 | Hillan | H04B 5/00 455/41.1 |
| 2017/0085297 | A1* | 3/2017 | Gao | H02J 50/20 |
| 2017/0093197 | A1* | 3/2017 | Gao | H02J 7/025 |

FOREIGN PATENT DOCUMENTS

JP 2014-96612 A 5/2014

* cited by examiner

*Primary Examiner* — Kashif Siddiqui
(74) *Attorney, Agent, or Firm* — Canon U.S.A. Inc., IP Division

(57) ABSTRACT

A power supplying apparatus includes a power supplying unit that contactlessly supplies power to a power receiving apparatus, a communication unit that wirelessly communicates with the power receiving apparatus, and a control unit that controls supply of power and communication such that the supply of power and the communication are exclusively executed, wherein when communication is executed after supply of power is executed, communication is disabled until power output from the power supplying unit becomes less than or equal to a predetermined value.

19 Claims, 10 Drawing Sheets

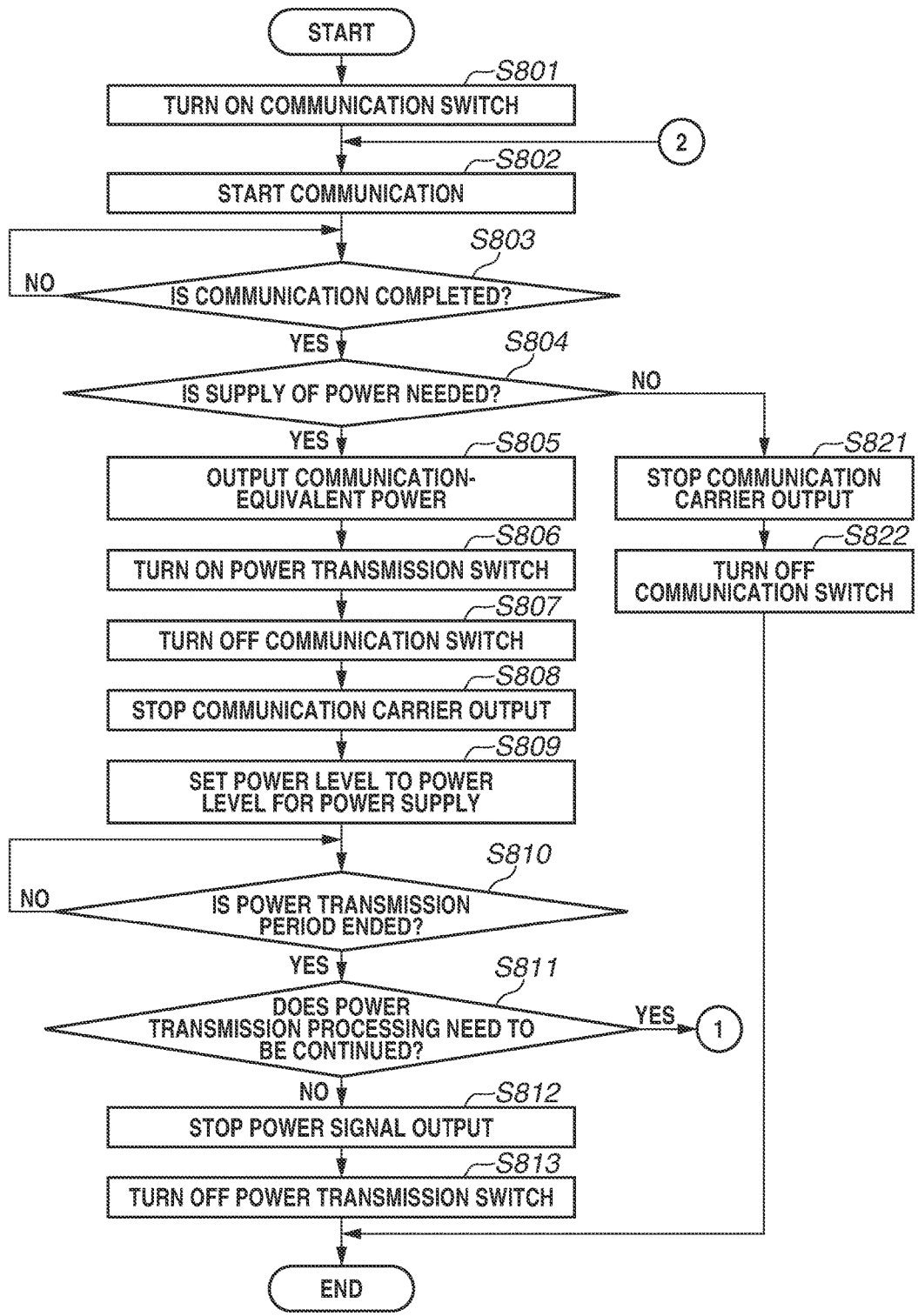

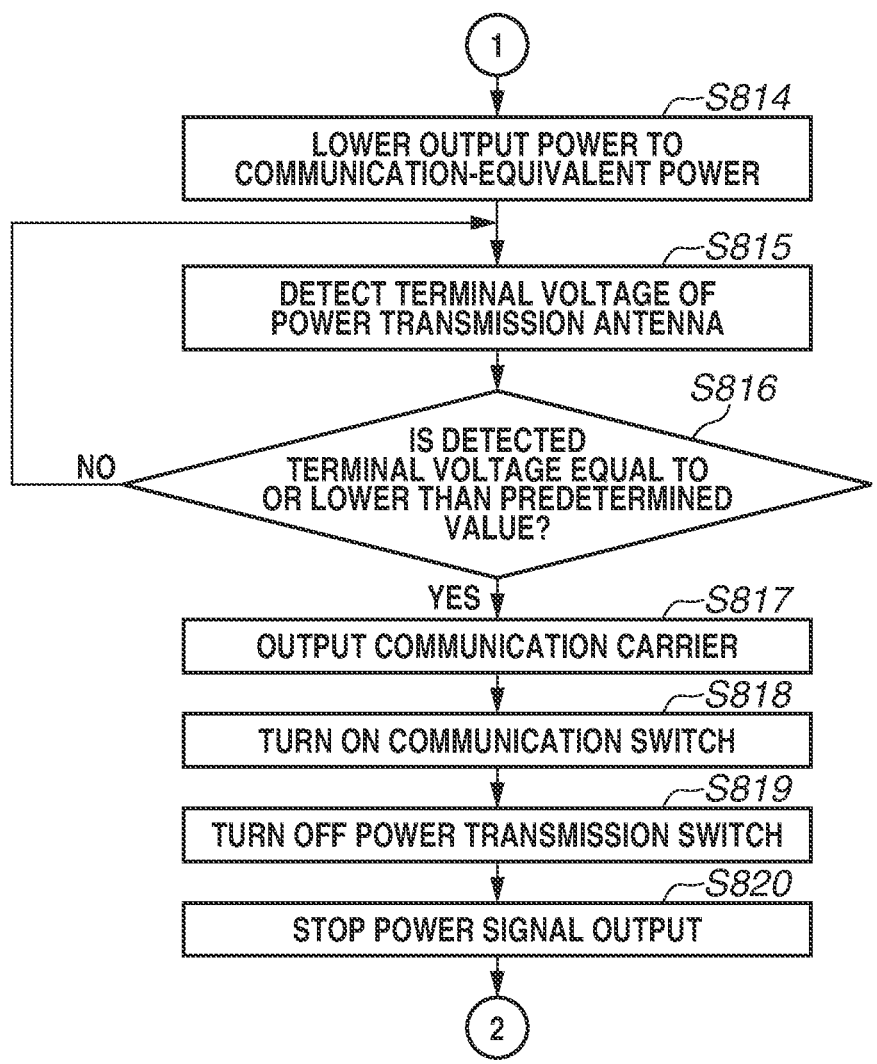

POWER SUPPLYING APPARATUS CAPABLE OF EXECUTING WIRELESS POWER SUPPLY TO POWER RECEIVING APPARATUS AND WIRELESS COMMUNICATION WITH THE SAME

BACKGROUND

Field

Aspects of the present invention generally relate to a power supplying apparatus that wirelessly supplies power to a power receiving apparatus.

Description of the Related Art

In recent years, a contactless power transmission system has been known in which power is wirelessly or contactlessly transmitted without a physical connection, e.g., using a connector. The contactless power transmission system includes a power transmitting apparatus and a power receiving apparatus. The power transmitting apparatus includes a power transmission antenna forming a primary coil for contactless power transmission. The power receiving apparatus includes a power receiving antenna forming a secondary coil corresponding to the primary coil. Power is contactlessly or wirelessly transmitted from the power transmitting apparatus to the power receiving apparatus by electromagnetic coupling between the power transmission antenna and the power receiving antenna.

There is also known a contactless power transmission system in which wireless communication between a power transmitting apparatus and a power receiving apparatus is realized using a coil-shaped or loop-shaped communication antenna different from a primary coil. In the conventional techniques, power transmission and communication are conducted using time division to prevent interference between the power transmission and the communication. However, in the case where time division is used alone, a power signal coming from the power transmission antenna and diffracted around the communication antenna can influence, such as overvoltage, a communication unit (e.g., communication module such as communication integrated circuit (IC)).

SUMMARY

According to an aspect of the present invention, a power supplying apparatus includes a power supplying unit configured to contactlessly supply power to a power receiving apparatus, a communication unit configured to wirelessly communicate with the power receiving apparatus, and a control unit configured to control the supply of power by the power supplying unit and the communication by the communication unit such that the supply of power and the communication are exclusively executed, wherein in a case where the control unit performs control such that the communication is executed after the supply of power is executed, the control unit disables the communication unit until output power from the power supplying unit becomes less than or equal to a predetermined value.

Further features of aspects of the present invention will become apparent from the following description of exemplary embodiments with reference to the attached drawings.

BRIEF DESCRIPTION OF THE DRAWINGS

FIG. 8A is yet another flow chart illustrating switching control between communication and power transmission. FIG. 8B is a flow chart illustrating a processing procedure following the processing procedure illustrated in FIG. 8A.

DESCRIPTION OF THE EMBODIMENTS

Various exemplary embodiments of the invention will be described in detail below with reference to the drawings. It should be noted, however, that the exemplary embodiments described below are mere illustration of the aspects of the invention and are not intended to limit the scope of the aspects of the invention thereto.

Figure 1:
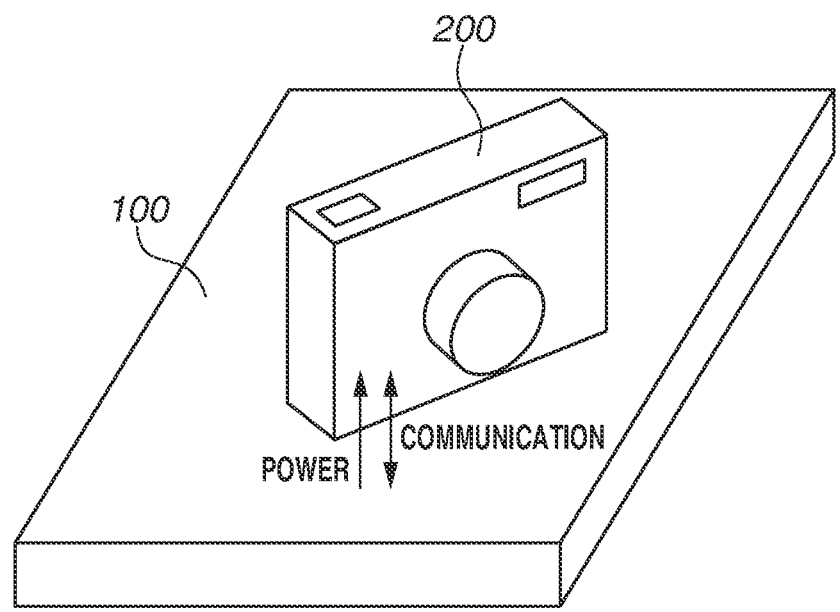
FIG. 1 is an external view illustrating a wireless power transmission system being used according to an exemplary embodiment.
Figure 2:
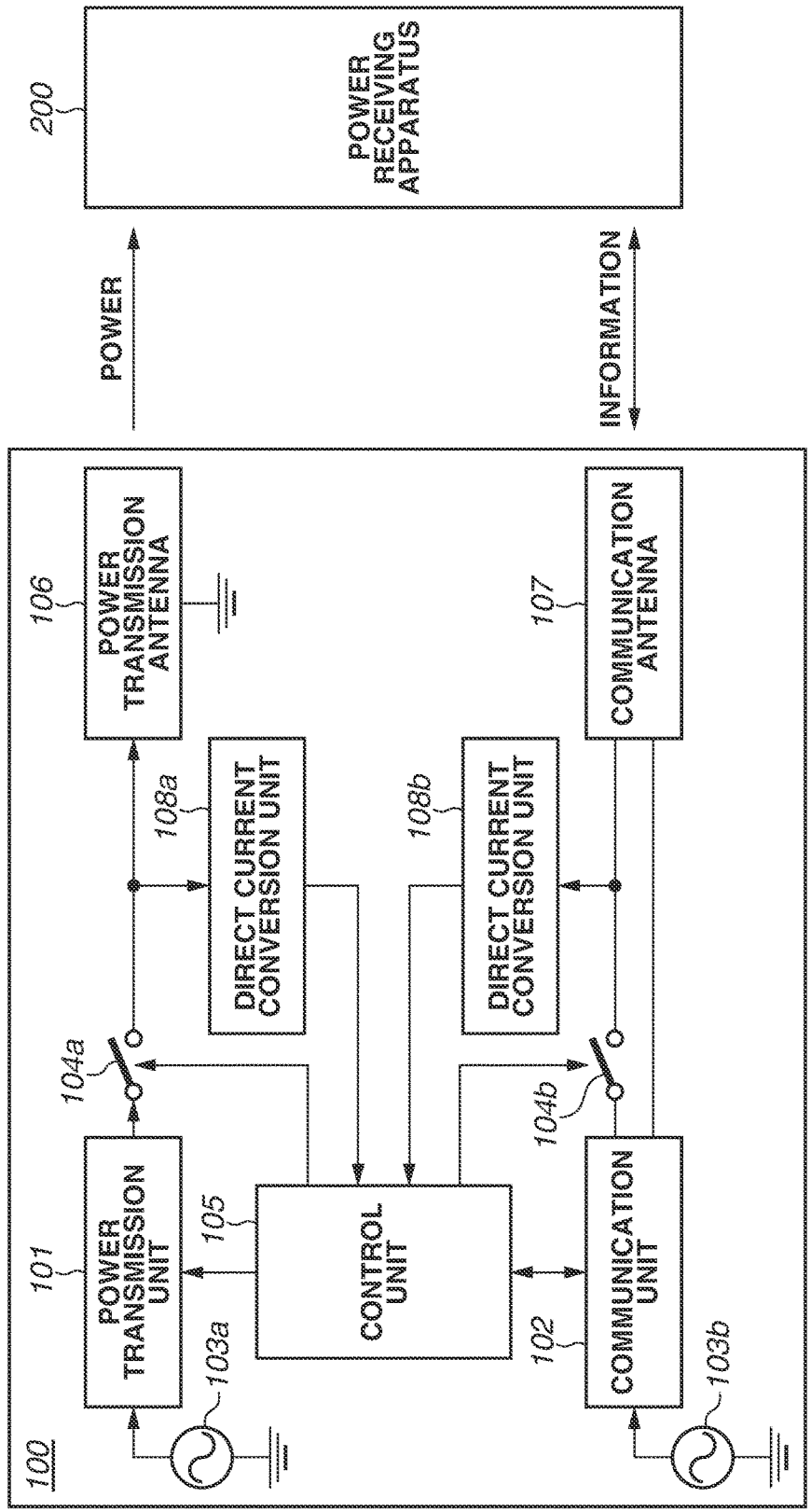
FIG. 2 is a block diagram schematically illustrating a power transmitting apparatus.

FIG. 1 is an external view illustrating a contactless power transmission system according to first and second exemplary embodiments. The contactless power transmission system illustrated in FIG. 1 includes a power receiving apparatus 200 and a power transmitting apparatus 100, as illustrated in FIG. 1. The power transmitting apparatus 100 contactlessly supplies power to and wirelessly communicates with the power receiving apparatus 200. FIG. 2 is a block diagram schematically illustrating the configuration of the power transmitting apparatus 100.

When the power receiving apparatus 200 is in a predetermined position within a predetermined distance from the power transmitting apparatus 100, the power transmitting apparatus 100 can contactlessly transmit power to and communicate with the power receiving apparatus 200. The power transmitting apparatus 100 includes a power transmission antenna 106 and a communication antenna 107. The power transmission antenna 106 corresponds to a primary coil for contactless power transmission. The communication antenna 107 is for wireless communication with the power receiving apparatus 200. The power transmitting apparatus 100 wirelessly communicates with the power receiving apparatus 200 via the communication antenna 107 and determines whether the power receiving apparatus 200 is a counterpart apparatus capable of receiving power supply from the power transmitting apparatus 100, whether supply of power is needed, etc. If the power receiving apparatus 200 is a counterpart apparatus, the power transmitting apparatus 100 supplies power to the power receiving apparatus 200 via the power transmission antenna 106.

The power receiving apparatus 200 charges a built-in secondary battery with the power supplied from the power transmitting apparatus 100, and directly uses the received power to operate an internal circuit. The power receiving apparatus 200 is an image capturing apparatus, such as a digital still camera or a digital video camera, or an apparatus configured to record and reproduce audio data or video data. The power receiving apparatus 200 can be a mobile information apparatus, such as a mobile phone or a smartphone, or a moving apparatus, such as a car. The power receiving apparatus 200 can be a mouse or a speaker that includes no secondary battery and is operated solely by the power received from the power transmitting apparatus 100.

The power transmitting apparatus 100 detects, either continuously or at regular intervals, whether the power receiving apparatus 200 is located within a predetermined distance from the power transmitting apparatus 100. For example, the power transmitting apparatus 100 emits a probe signal for the detection of the power receiving apparatus 200 from the communication antenna 107 at regular intervals. The power receiving apparatus 200 returns a predetermined response signal to the probe signal to the power transmitting apparatus 100. By limiting the power of the probe signal, the predetermined distance can be set. As used herein, the predetermined distance refers to a distance within which contactless power supply and wireless communication are both possible. The power level of the probe signal received by the power receiving apparatus 200 is returned to the power transmitting apparatus 100 so that the power transmitting apparatus 100 can control the contactless power supply according to the distance between the power transmitting apparatus 100 and the power receiving apparatus 200.

The following describes the configuration of the power transmitting apparatus 100 with reference to FIG. 2. A power transmission unit 101 performs power amplification on an alternating current signal transmitted from an oscillator 103a and generates an alternating current power signal to be transmitted to the power receiving apparatus 200. The oscillator 103a includes a crystal oscillator and outputs a carrier signal of a specific frequency. The output of the power transmission unit 101 is grounded via a power transmission switch 104a and a power transmission antenna 106. The power transmission unit 101 can change the power level of an alternating current power signal to be output either continuously or stepwise in a plurality of levels. For example, a control unit 105 controls the power level of an alternating current power signal to be output from the power transmission unit 101 according to power demand in the power receiving apparatus 200.

The power emitted from the power transmission antenna 106 toward the power receiving apparatus 200 is alternating current power, and the alternating current frequency of the power is a resonance frequency f determined by the power transmission antenna 106 and a resonance circuit built in the power transmission unit 101. The resonance frequency f is expressed by the following formula:

$$f=1/\{2\pi(LC)^{1/2}\}\},$$

where L is an inductance value determined by the power transmission antenna 106 and an external parasitic factor, and C is a capacitance value of the resonance circuit and a parasitic factor in the power transmitting apparatus 100. The resonance frequency f is determined based on the power transmission antenna 106, the resonance circuit in the power transmission unit 101, and the parasitic factors of a housing of the power transmitting apparatus 100 and an external circuit.

A communication unit 102 performs intensity modulation, e.g., on/off modulation, on the alternating current signal from an oscillator 103b with a signal from the control unit 105, and generates a communication signal, such as a command for the power receiving apparatus 200. The oscillator 103b includes a crystal oscillator and outputs a carrier signal of a specific frequency. The output of the communication unit 102 is applied to the communication antenna 107 via a communication switch 104b.

The communication antenna 107 receives a communication signal from the power receiving apparatus 200 and supplies the communication signal to the communication unit 102 via the communication switch 104b. The communication signal from the power receiving apparatus 200 includes a response signal to a command transmitted from the power transmitting apparatus 100 to the power receiving apparatus 200, a status signal indicating an operation state of the power receiving apparatus 200, and a command for the power transmitting apparatus 100. The communication unit 102 demodulates the communication signal from the power receiving apparatus 200 and outputs a demodulation result (a command, a control signal, a status signal, etc. from the power receiving apparatus 200) to the control unit 105.

In this way, the control unit 105 of the power transmitting apparatus 100 can transmit and receive a control signal, a status signal, etc. to and from the power receiving apparatus 200 using the communication unit 102 and the communication antenna 107.

A general-purpose or standard communication method can be used as the communication method of the communication unit 102, and the communication counterpart is not limited to the power receiving apparatus 200. A command that the communication unit 102 transmits is a command compliant with a predetermined communication protocol. Examples of communication protocols that can be used include an International Standards Organization/International Electrotechnical Commission (ISO/IEC) 18092 compliant communication protocol, such as radio frequency identification (RFID). A communication protocol that is near field communication (NFC) compliant can also be used.

A communication signal transmitted and received between the power transmitting apparatus 100 and the power receiving apparatus 200 can contain destination identification information designating a destination. In this case, only an apparatus designated as a destination performs processing to receive the communication signal. This function is applicable in a case where, for example, the power transmitting apparatus 100 simultaneously supplies power to a plurality of power receiving apparatuses 200 or in a case where a plurality of power transmitting apparatuses 100 can supply power to a single power receiving apparatus 200 or a plurality of power receiving apparatuses 200.

A direct current conversion unit 108a converts an alternating current power signal between the power transmission switch 104a and the power transmission antenna 106 into a direct current voltage and notifies the control unit 105 of a value of the direct current voltage. A direct current conversion unit 108b converts a communication signal between the communication switch 104b and the communication antenna 107 into a direct current voltage and notifies the control unit 105 of a value of the direct current voltage. The control unit 105 uses the value of the direct current voltage notified from the direct current conversion unit 108a to monitor the amount of alternating current power emitted from the power transmission antenna 106 external to the power transmission antenna 106, i.e., towards the power receiving apparatus 200. The control unit 105 uses the value of the direct current voltage notified from the direct current conversion unit 108b to monitor the presence/absence of communication with an external apparatus (power receiving apparatus 200) via the communication antenna 107 and the amount of power.

In the present exemplary embodiment, the oscillation frequency of the oscillator 103a is set equal to the oscillation frequency of the oscillator 103b, so the output of a single oscillator can be supplied to the power transmission unit 101 and the communication unit 102. This facilitates synchronization of the phase of an alternating current power signal (power wave) output from the power transmission antenna 106 with the phase of a wireless signal emitted from the communication antenna 107. This synchronization can prevent an occurrence of a state in which the phases of the power transmission output and the communication signal are inverted and weakened by each other at the time of switching control between communication and power transmission.

In general, the oscillation frequency of the oscillator 103a is set to a frequency suitable for the contactless power supply to the power receiving apparatus 200, and the oscillation frequency of the oscillator 103b is set to a frequency suitable for the wireless communication with the power receiving apparatus 200. The frequencies of the oscillators 103a and 103b are different from each other so that a component, diffracted around the communication unit 102, of a power signal (power wave) output from the power transmission antenna 106 is easily removed or reduced with a filter.

Each of the power transmission switch 104a and the communication switch 104b is a semiconductor switch or a relay switch, such as an electromagnetic relay.

The control unit 105 includes a central processing unit (CPU), a read only memory (ROM), a random access memory (RAM), and a timer and controls the entire power transmitting apparatus 100. The control unit 105 also includes an analog/digital (A/D) conversion unit configured to convert an analog output from the direct current conversion units 108a and 108b into a digital value.

The control unit 105 controls the power transmission unit 101 to control the presence/absence (on/off) of output of an alternating current power signal and also controls the amount of power of an alternating current power signal to be output. The control unit 105 controls the communication unit 102 to control whether communication with an external apparatus (power receiving apparatus 200) can be performed. The control unit 105 supplies, to the communication unit 102, a control signal, etc. to be transmitted to an external apparatus (power receiving apparatus 200), and the communication unit 102 demodulates a control signal, etc. transmitted from an external apparatus and supplies the demodulated control signal, etc. to the control unit 105.

Figure 3:
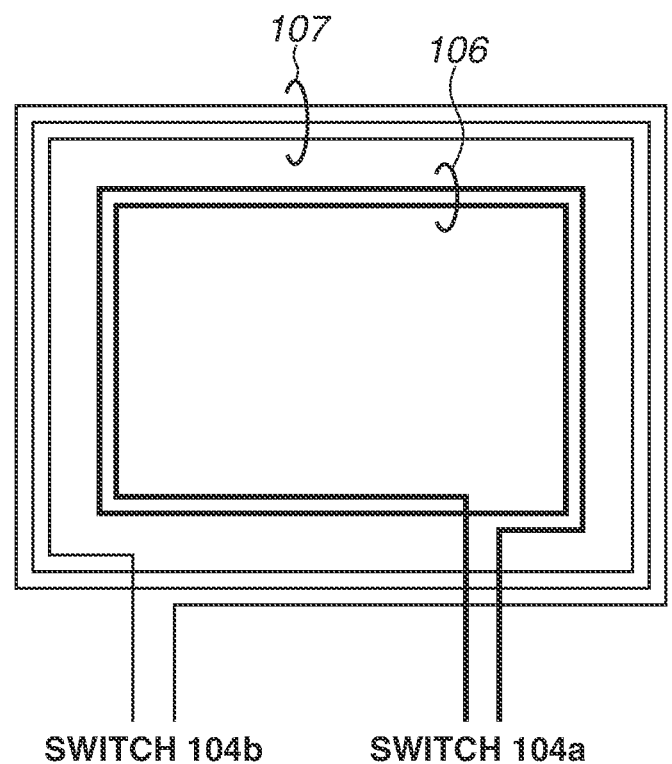
FIG. 3 is a plane view illustrating an example of an arrangement of a power transmission antenna and a communication antenna.

FIG. 3 illustrates an example of the positional relationship between the power transmission antenna 106 and the communication antenna 107. As illustrated in FIG. 3, the communication antenna 107 is coil-shaped and is positioned concentrically with a coil portion of the power transmission antenna 106 and located outside the power transmission antenna 106. The power transmission antenna 106 can be located outside an outer periphery of the communication antenna 107.

The power receiving apparatus 200 can include a power receiving antenna corresponding to the power transmission antenna 106 and a communication antenna corresponding to the communication antenna 107 as separate antennas, or can use a single coil (or antenna) for both power reception and communication.

Figure 4:
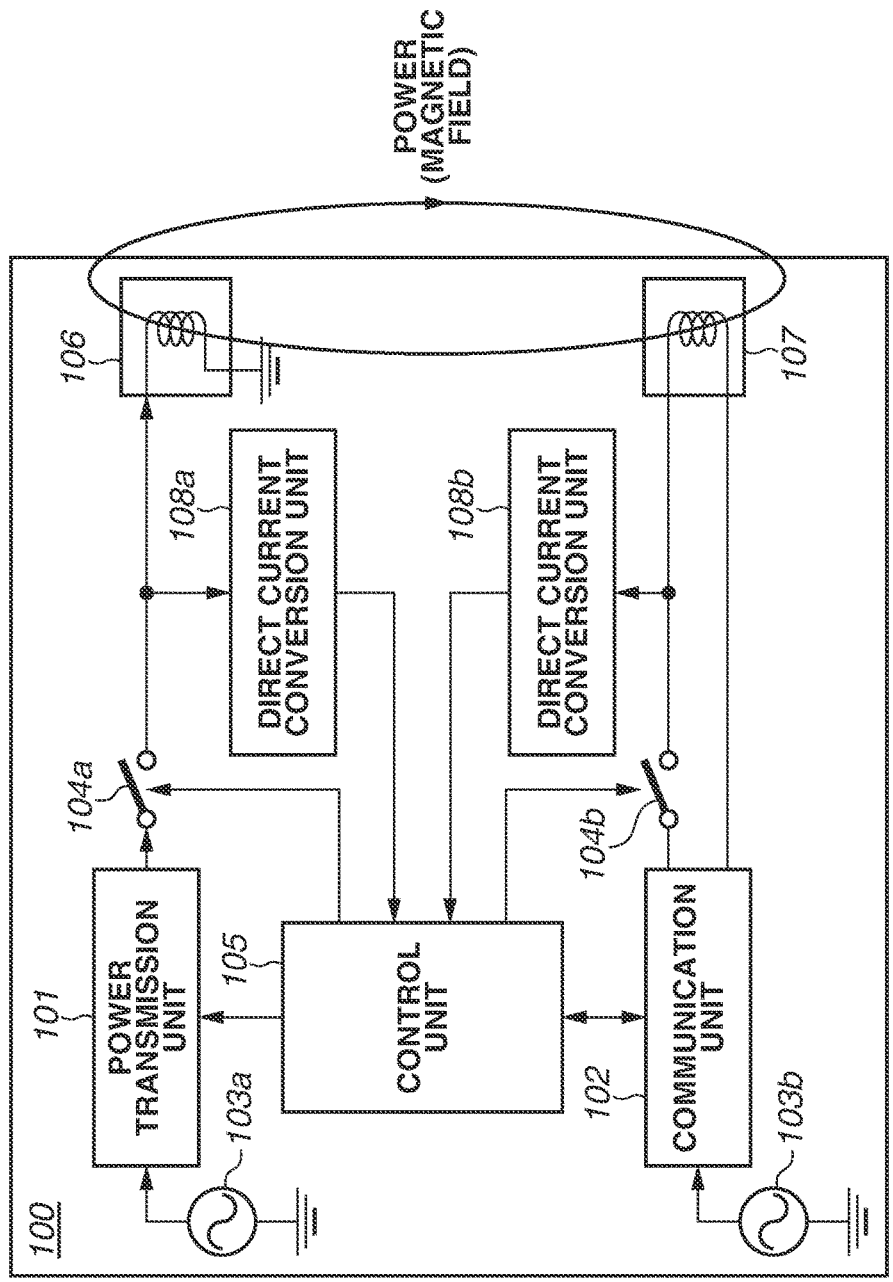
FIG. 4 is a diagram illustrating a magnetic field generated by a power transmission antenna.

In the concentric configuration illustrated as an example in FIG. 3, the power transmission antenna 106 and the communication antenna 107 are magnetically tightly connected. Thus, during the power transmission, as illustrated in FIG. 4, an alternating current power signal (power wave) emitted from the power transmission antenna 106 is transmitted to the communication antenna 107. This increases a possibility of damage to the communication unit 102 and communication jamming. During the communication, a communication signal transmitted and received by the communication antenna 107 is transmitted to the power transmission antenna 106, but this has a small or no adverse effect on the power transmission unit 101 and the power receiving apparatus 200 in terms of power. In the present exemplary embodiment, in order to prevent an alternating current power signal (power wave) being diffracted around a communication path, the power transmission switch 104a and the communication switch 104b are provided, and communication and power transmission are controlled using time division.

Figure 5:
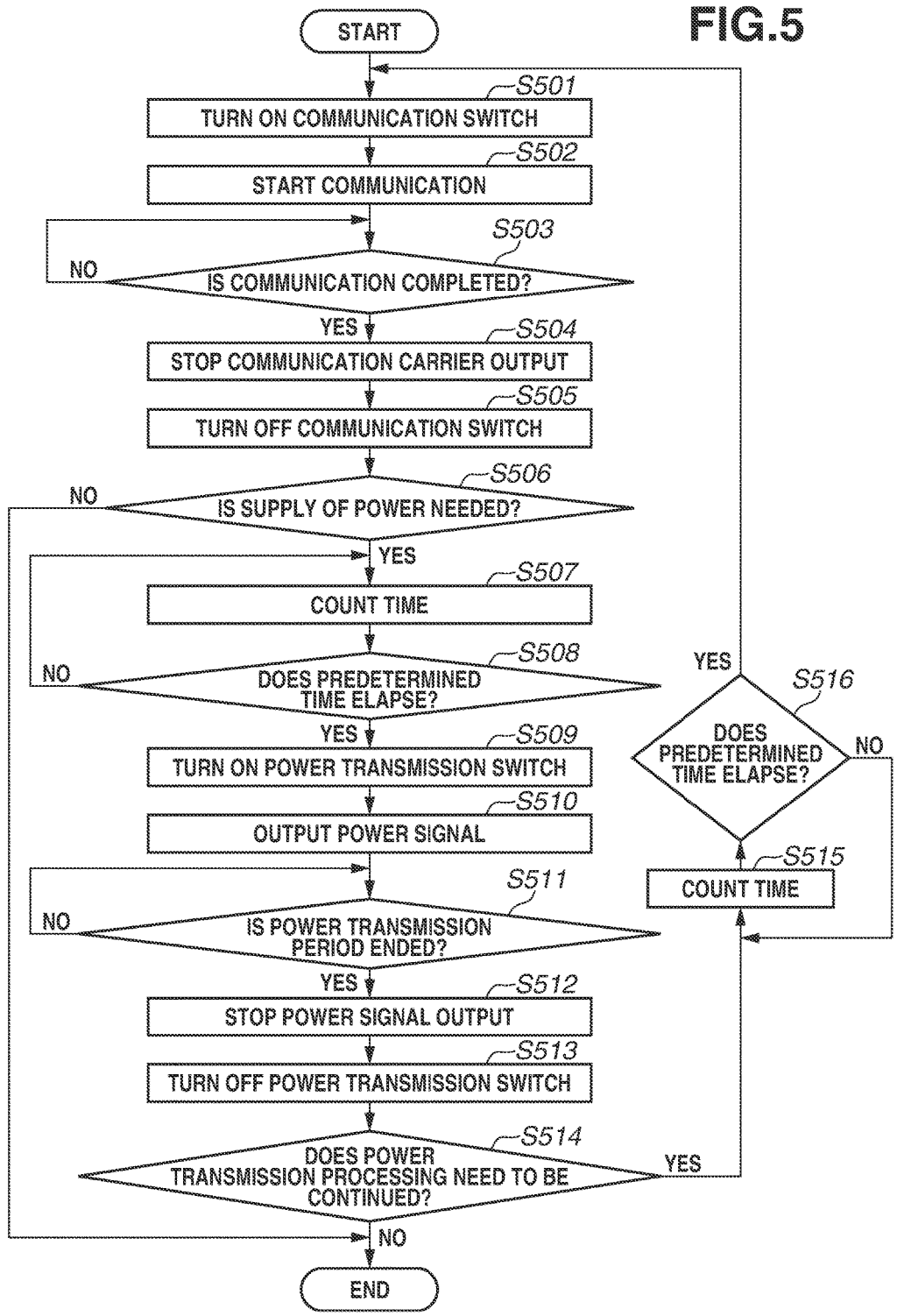
FIG. 5 is a flow chart illustrating switching control between communication and power transmission.

FIG. 5 is a flow chart illustrating operations of time-division exclusive control on communication and power transmission by the power transmission switch 104a and the communication switch 104b. With the power receiving apparatus 200 located within a distance and range from the power transmitting apparatus 100 within which the power transmitting apparatus 100 can transmit power to the power receiving apparatus 200 and can communicate with the power receiving apparatus 200, the control unit 105 executes the control operations specified in the flow illustrated in FIG. 5. Before the control illustrated in FIG. 5 is started, i.e., in an initial state in which neither power transmission nor communication is started, the power transmission switch 104a and the communication switch 104b are in an open (opened) state. For example, the power transmission switch 104a and the communication switch 104b are normally-open switches. In this state, the communication antenna 107 is electrically disconnected from the communication unit 102, and the power transmission antenna 106 is electrically disconnected from the output of the power transmission unit 101.

In step S501, the control unit 105 of the power transmitting apparatus 100 turns on (close) the communication switch 104b. Consequently, an input/output unit of the communication unit 102 is electrically connected to the communication antenna 107 so that the power transmitting apparatus 100 can communicate with the power receiving apparatus 200. In a case where the power transmission switch 104a is on, the control unit 105 turns off the power transmission switch 104a.

In step S502, the control unit 105 transmits to the communication unit 102 a control signal to request the communication unit 102 to start communication. The communication unit 102 modulates an output frequency signal of the oscillator 103b with the control signal transmitted from the control unit 105 and generates a communication signal for the power receiving apparatus 200. The communication signal is applied to the communication antenna 107 via the communication switch 104b and received by the power receiving apparatus 200. The communication unit 102 demodulates a response signal from the power receiving apparatus 200 and notifies the control unit 105 of contents of the response. In this way, the power transmitting apparatus 100 starts communication with the power receiving apparatus 200.

In step S503, the control unit 105 waits for completion of the communication performed by the communication unit 102 with the power receiving apparatus 200. The control unit 105 determines completion of the communication by analyzing the contents of the response from the power receiving apparatus 200 that is received via the communication unit 102. In the present exemplary embodiment, completion of the communication includes a timing at which the communication can be suspended. If the control unit 105 determines that the communication is completed (YES in step S503), the processing proceeds to step S504.

In step S504, the control unit 105 requests the communication unit 102 to stop outputting the communication carrier. In response to the request, the communication unit 102 stops outputting the communication carrier. In step S505, the control unit 105 turns off the communication switch 104b, and the processing proceeds to step S506.

In step S506, the control unit 105 determines, based on the response signal received from the power receiving apparatus 200 in step S503, whether the power receiving apparatus 200 needs supply of power from the power transmitting apparatus 100. If the control unit 105 determines that the power receiving apparatus 200 needs supply of power from the power transmitting apparatus 100 (YES in step S506), the processing proceeds to step S507. If the control unit 105 determines that the power receiving apparatus 200 does not need supply of power from the power transmitting apparatus 100 (NO in step S506), the flow illustrated in FIG. 5 ends.

In step S507, the control unit 105 counts the output of a built-in timer. In step S508, the control unit 105 waits until a predetermined time elapses before a start of power transmission. The predetermined time is stored in advance in a ROM built in the control unit 105. The predetermined time is set, for example, to a time corresponding to a time that is sufficient to assure that a communication unit equivalent to the communication unit 102 is electrically disconnected from a communication antenna equivalent to the communication antenna 107 in the power receiving apparatus 200 as the communication is completed. It can also be said that the predetermined time is a float time during the switch from the communication state to the power transmission state. If the predetermined time elapses (YES in step S508), the processing proceeds to step S509.

In step S509, the control unit 105 turns on the power transmission switch 104a. Consequently, the output of the power transmission unit 101 is electrically connected to the power transmission antenna 106 via the power transmission switch 104a. In step S510, the control unit 105 controls the power transmission unit 101 to output an alternating current power signal that carries power. In step S511, the control unit 105 determines whether the power transmission period has ended. For example, if the built-in timer indicates that a predetermined time elapses since the start of the power transmission, the control unit 105 determines that the power transmission period has ended. In another method, the control unit 105 determines that the power transmission period has ended if the control unit 105 detects overcurrent, etc. in the output from the power transmission unit 101.

If the control unit 105 determines that the power transmission period has ended (YES in step S511), then in step S512, the control unit 105 controls the power transmission unit 101 to stop outputting the alternating current power signal, and the processing proceeds to step S513. In step S513, the control unit 105 turns off the power transmission switch 104a, and the processing proceeds to step S514. External emission of the alternating current power signal from the power transmission antenna 106 stops and there is, thus, no component being diffracted around the communication antenna 107.

In step S514, the control unit 105 determines whether the power transmission processing needs to continue. If the control unit 105 determines that the power transmission processing does not need to continue (NO in step S514), the processing illustrated in FIG. 5 has ended. For example, in a case where overcurrent is detected in the power transmission unit 101, the control unit 105 ends the power transmission processing. If the control unit 105 determines that the power transmission processing needs to continue (YES in step S514), the processing proceeds to step S515.

In step S515, the control unit 105 counts the output of the built-in timer. In step S516, the control unit 105 waits until a predetermined time elapses before a start of communication. The predetermined time is stored in advance in the ROM built in the control unit 105. The predetermined time is set, for example, to a time corresponding to a time over which electromagnetic emission of an alternating current power signal from the power transmission antenna 106 ends as the power transmission ends. The predetermined time can be a time over which the voltage is attenuated to a level that the supply of an alternating current power signal output from the power transmission antenna 106 to the communication unit 102 via the communication antenna 107 does not cause the voltage applied to the communication unit 102 to become overvoltage, etc. In a case where it is not possible to ignore a time needed to switch from the power reception state to the communication state by the communication unit equivalent to the communication unit 102 in the power receiving apparatus 200, the predetermined time can be set longer than the time needed.

If the predetermined time before the start of communication elapses (YES in step S516), the processing proceeds to step S501, and the control unit 105 re-executes step S501 and subsequent steps described above.

Figure 6:
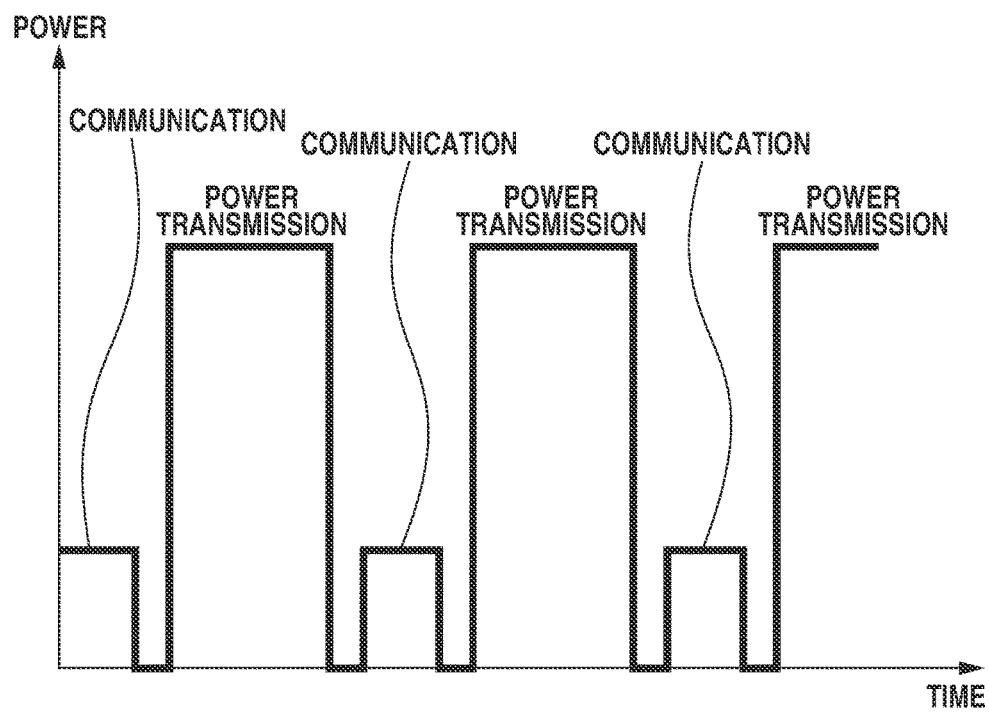
FIG. 6 is a timing chart of communication and power transmission by the control illustrated in FIG. 5.

FIG. 6 is a timing chart of power transmission and communication by the switching control illustrated in FIG. 5. The abscissa axis represents time and the ordinate axis represents power. By steps S507 and S508, a no-power period is set during the switching from communication to power transmission. By steps S515 and S516, a no-power period is also set during the switching from power transmission to communication.

The time-division switching control between power transmission and communication as illustrated in FIG. 5 enables each of the power transmission and the communication to be executed with suitable power without affecting each other. A predetermined blank period is set during the switching so that stable operation can be expected in both power transmission and communication. By setting the blank period during the switching from power transmission to communication, application of overvoltage, etc. to the communication unit 102 can be prevented.

In the block diagram illustrated in FIG. 1, the power transmitting apparatus 100 interrupts outputting of the communication carrier for a predetermined period during the switching control between communication and power transmission so that the communication with the power receiving apparatus 200 can be initialized. The reason is as follows. From the interruption of inputting of the communication carrier, the communication unit of the power receiving apparatus 200 recognizes that the communication with the power transmitting apparatus 100 has ended, and when the communication carrier is input again, the communication unit of the power receiving apparatus 200 executes an initialization operation.

Figure 7:
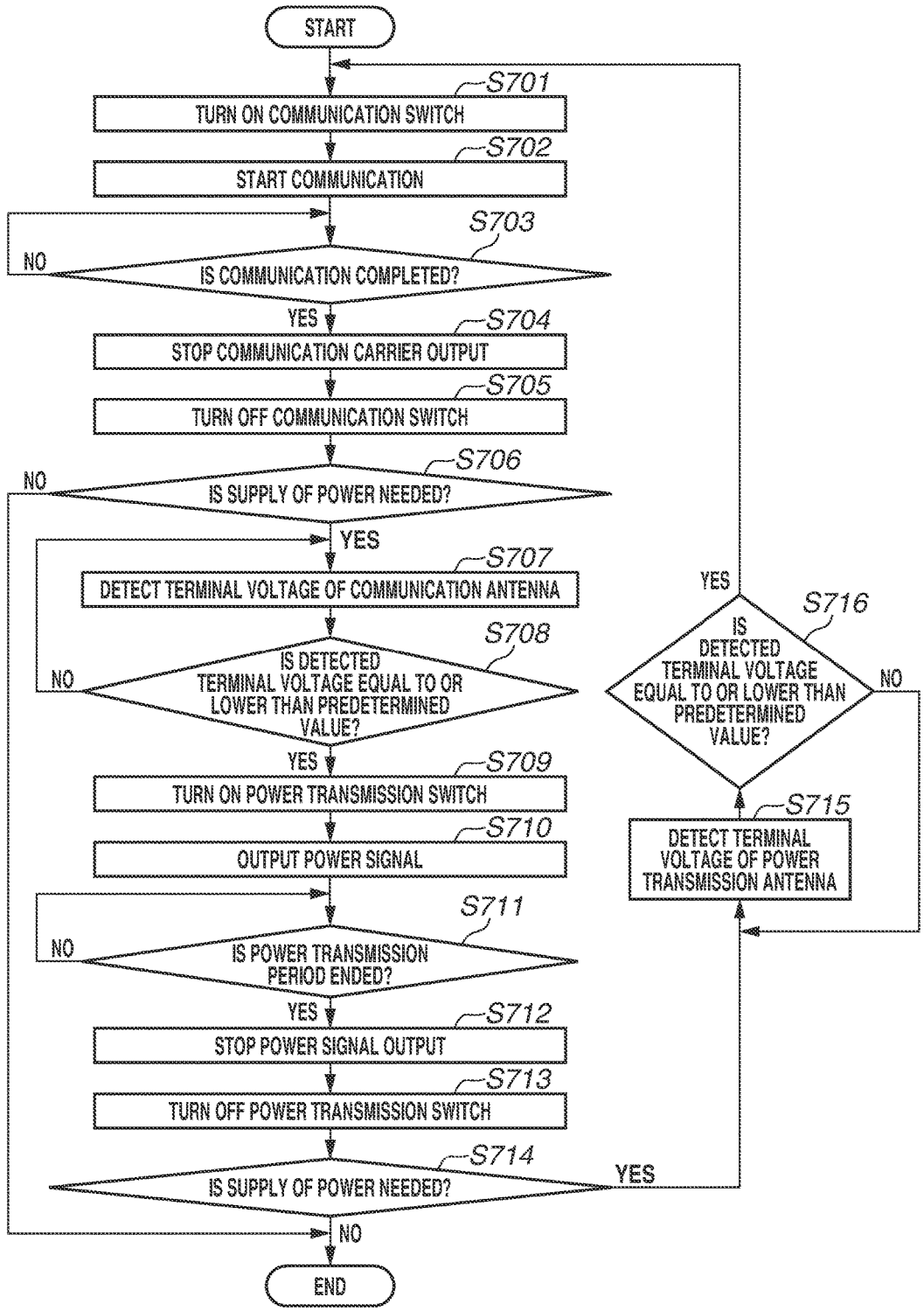
FIG. 7 is another flow chart illustrating switching control between communication and power transmission.

FIG. 7 is a flow chart illustrating operations for the time-division switching control between communication and power transmission, which is a modification of the control flow illustrated in FIG. 5. In a second exemplary embodiment, such switching control between power transmission and communication can prevent a communication error originating from a difference in communication states between the power transmitting apparatus 100 and the power receiving apparatus 200. With the power receiving apparatus 200 being located within a distance and range from the power transmitting apparatus 100 within which the power transmitting apparatus 100 can transmit power to the power receiving apparatus 200 and can communicate with the power receiving apparatus 200, the control unit 105 executes the control operations specified in the flow illustrated in FIG. 7. Before the control illustrated in FIG. 7 is started, i.e., in an initial state in which neither power transmission nor communication is started, the power transmission switch 104a and the communication switch 104b are in an open (opened) state. The control unit 105 controls the timing to switch between communication and power transmission according to the output from the direct current conversion units 108a and 108b.

In step S701, the control unit 105 of the power transmitting apparatus 100 turns on (close) the communication switch 104b. Consequently, the input/output unit of the communication unit 102 is electrically connected to the communication antenna 107 so that the power transmitting apparatus 100 can communicate with the power receiving apparatus 200. In a case where the power transmission switch 104a is on, the control unit 105 turns off the power transmission switch 104a.

In step S702, the control unit 105 transmits to the communication unit 102 a control signal to request the communication unit 102 to start communication. The communication unit 102 modulates an output frequency signal of the oscillator 103b with the control signal transmitted from the control unit 105 and generates a communication signal for the power receiving apparatus 200. The communication signal is applied to the communication antenna 107 via the communication switch 104b and received by the power receiving apparatus 200. The communication unit 102 demodulates a response signal from the power receiving apparatus 200 and notifies the control unit 105 of contents of the response. In this way, the power transmitting apparatus 100 starts communication with the power receiving apparatus 200.

In step S703, the control unit 105 waits for completion of the communication performed by the communication unit 102 with the power receiving apparatus 200. The control unit 105 determines completion of the communication by analyzing the contents of the response from the power receiving apparatus 200 that is received via the communication unit 102. In the present exemplary embodiment, completion of the communication includes a timing at which the communication can be suspended. If the control unit 105 determines that the communication is completed (YES in step S703), the processing proceeds to step S704.

In step S704, the control unit 105 requests the communication unit 102 to stop outputting the communication carrier. In response to the request, the communication unit 102 stops outputting the communication carrier. In step S705, the control unit 105 turns off the communication switch 104b, and the processing proceeds to step S706.

In step S706, the control unit 105 determines, based on the response signal received from the power receiving apparatus 200 in step S703 whether the power receiving apparatus 200 needs supply of power from the power transmitting apparatus 100. If the control unit 105 determines that the power receiving apparatus 200 needs supply of power from the power transmitting apparatus 100 (YES in step S706), the processing proceeds to step S707. If the control unit 105 determines that the power receiving apparatus 200 does not need supply of power from the power transmitting apparatus 100 (NO in step S706), the flow illustrated in FIG. 7 ends.

In step S707, the control unit 105 detects an antenna terminal voltage of the communication antenna 107 from the output of the direct current conversion unit 108b. In step S708, the control unit 105 determines whether the detected antenna terminal voltage is less than or equal to a predetermined value. The control unit 105 repeats detection of the antenna terminal voltage (step S707) until the detected antenna terminal voltage is less than or equal to the predetermined value (step S708). The predetermined value is stored in advance in the ROM built in the control unit 105 and is a voltage threshold value indicating that the value of the output communication carrier is low enough for occurrence of communication initialization. If the antenna terminal voltage becomes less than or equal to the predetermined value (YES in step S708), the processing proceeds to step S709.

In a case where the power receiving apparatus 200 is to be initialized each time the power transmitting apparatus 100 ends the communication, the processing specified in steps S507 and S508 can be inserted between steps S708 and S709.

In step S709, the control unit 105 turns on the power transmission switch 104a. Consequently, the output of the power transmission unit 101 is electrically connected to the power transmission antenna 106 via the power transmission switch 104a. In step S710, the control unit 105 controls the power transmission unit 101 to output an alternating current power signal that carries power. In step S711, the control unit 105 determines whether the power transmission period has ended. For example, if the built-in timer indicates that a predetermined time elapses since the start of the power transmission, the control unit 105 determines that the power transmission period has ended. In another method, the control unit 105 determines that the power transmission period has ended if the control unit 105 detects overcurrent, etc. in the output from the power transmission unit 101.

If the control unit 105 determines that the power transmission period has ended (YES in step S711), then in step S712, the control unit 105 controls the power transmission unit 101 to stop outputting the alternating current power signal, and the processing proceeds to step S713. In step S713, the control unit 105 turns off the power transmission switch 104a, and the processing proceeds to step S714. External emission of the alternating current power signal from the power transmission antenna 106 stops and there is, thus, no component being diffracted around the communication antenna 107.

In step S714, the control unit 105 determines whether the power transmission processing needs to continue. If the control unit 105 determines that the power transmission processing does not need to continue (NO in step S714), the processing illustrated in FIG. 7 ends. For example, in a case where overcurrent is detected in the power transmission unit 101, the control unit 105 ends the power transmission processing. If the control unit 105 determines that the power transmission processing needs to continue (YES in step S714), the processing proceeds to step S715.

In step S715, the control unit 105 detects the antenna terminal voltage of the power transmission antenna 106 from the output of the direct current conversion unit 108a. In step S716, the control unit 105 determines whether the detected antenna terminal voltage is less than or equal to a predetermined value. The control unit 105 repeats detection of the antenna terminal voltage (step S716) until the detected antenna terminal voltage is less than or equal to the predetermined value (step S715). The predetermined value is stored in advance in the ROM built in the control unit 105 and is a voltage threshold value that indicates that the magnetic flux intensity of the power transmission antenna 106 is weak enough not to negatively affect the communication unit 102. If the antenna terminal voltage is becomes less than or equal to the predetermined value (YES in step S716), the control unit 105 re-executes step S701 and subsequent steps described above.

By the switching control illustrated in FIG. 7, it becomes possible to prevent application of overvoltage, etc. to the communication unit 102. Since the switching from power transmission to communication is performed according to a result of the detection of the antenna terminal voltage in steps S715 and S716, application of overvoltage, etc. to the communication unit 102 can reliably be prevented at the time of the switching from power transmission to communication.

As to the processing in steps S707 and S708 in FIG. 7, the power transmitting apparatus 100 can switch from communication to power transmission based on a predetermined time as in steps S507 and S508 in FIG. 5. In this way, the state of the communication unit of the power receiving apparatus 200 can be initialized each time communication is completed.

During a communication period in which the power transmitting apparatus 100 communicates with the power receiving apparatus 200, the power transmitting apparatus 100 can transmit power to the power receiving apparatus 200 to an extent that the communication is not disturbed. FIG. 8 is a flow chart illustrating such control processing performed by the control unit 105.

The power level of an alternating current power signal to be output from the power transmission unit 101 can be changed in a plurality of levels. In a third exemplary embodiment, the output power of the power transmission unit 101 can be changed between a power level for power supply, at which sufficient power can be supplied to the power receiving apparatus 200, and a communication-equivalent power level, which corresponds to the power level of the communication signal with which the communication unit 102 communicates with the power receiving apparatus 200. The control unit 105 controls the power transmission unit 101 to the power level for power supply during a non-communication period during which the communication unit 102 does not communicate with the power receiving apparatus 200, whereas control unit 105 controls the power transmission unit 101 to the communication-equivalent power level during a communication period in which the communication unit 102 communicates with the power receiving apparatus 200. For example, the power level for power supply is about 1 W to 10 W, whereas the communication-equivalent power level is 1 W or lower.

With the power receiving apparatus 200 being located within a distance and range from the power transmitting apparatus 100 within which the power transmitting apparatus 100 can transmit power to the power receiving apparatus 200 and can communicate with the power receiving apparatus 200, the control unit 105 executes the control operations specified in the flow illustrated in FIG. 8. Before the control illustrated in FIG. 8 is started, i.e., in an initial state in which neither power transmission nor communication is started, the power transmission switch 104a and the communication switch 104b are in an open state. The control unit 105 controls the timing for switching control between communication and power transmission according to the output from the direct current conversion units 108a and 108b.

In step S801, the control unit 105 performs control to turn on the communication switch 104b. Consequently, the input/output unit of the communication unit 102 is electrically connected to the communication antenna 107 so that the power transmitting apparatus 100 can communicate with the power receiving apparatus 200. In a case where the power transmission switch 104a is on, the control unit 105 turns off the power transmission switch 104a.

In step S802, the control unit 105 transmits to the communication unit 102 a control signal to request the communication unit 102 to start communication. The communication unit 102 modulates an output frequency signal of the oscillator 103b with the control signal transmitted from the control unit 105 and generates a communication signal for the power receiving apparatus 200. The communication signal is applied to the communication antenna 107 via the communication switch 104b and received by the power receiving apparatus 200. The communication unit 102 demodulates a response signal from the power receiving apparatus 200 and notifies the control unit 105 of contents of the response. In this way, the power transmitting apparatus 100 starts communication with the power receiving apparatus 200.

In step S803, the control unit 105 waits for completion of the communication performed by the communication unit 102 with the power receiving apparatus 200. The control unit 105 determines completion of the communication by analyzing the contents of the response from the power receiving apparatus 200 that is received via the communication unit 102. In the present exemplary embodiment, completion of the communication includes a timing at which the communication can be suspended. If the control unit 105 determines that the communication is completed (YES in step S803), the processing proceeds to step S804.

In step S804, the control unit 105 determines whether the power receiving apparatus 200 needs supply of power from the power transmitting apparatus 100, based on the response signal received from the power receiving apparatus 200 in step S803. If the control unit 105 determines that the power receiving apparatus 200 needs supply of power from the power transmitting apparatus 100 (YES in step S804), the processing proceeds to step S805. If the control unit 105 determines that the power receiving apparatus 200 does not need supply of power from the power transmitting apparatus 100 (NO in step S804), the processing proceeds to step S821.

In step S805, the control unit 105 controls the power transmission unit 101 to output communication-equivalent power. The control unit 105 stores a value of the communication-equivalent power in advance in the built-in ROM.

In step S806, the control unit 105 turns on the power transmission switch 104a. Consequently, the output of the power transmission unit 101 is electrically connected to the power transmission antenna 106 via the power transmission switch 104a, and an alternating current power signal of the communication-equivalent power set in step S805 is emitted from the power transmission antenna 106 toward the power receiving apparatus 200. The power transmitting apparatus 100 outputs a combined signal of electromagnetic waves of the power transmission antenna 106 and the communication antenna 107, so it is desirable to lower the power of the communication signal output from the communication antenna 107 to a weaker level than the power at the time of actual communication.

In step S807, the control unit 105 turns off the communication switch 104b. Consequently, the communication carrier emitted from the communication antenna 107 is attenuated. The control unit 105 controls the output power of the power transmission unit 101 to maintain, at the communication-equivalent power, the alternating current power signal emitted from the power transmission antenna 106, so the power receiving apparatus 200 maintains the communication state with the alternating current power signal. In other words, the power receiving apparatus 200 does not initialize the communication state.

In step S808, the control unit 105 requests the communication unit 102 to stop outputting the communication carrier. In response to the request, the communication unit 102 stops outputting the communication carrier.

By the processing in steps S805 to S808, the communication power (communication carrier) output from the communication antenna 107 is switched to the alternating current power signal of the communication-equivalent power that is output from the power transmission antenna 106. With the alternating current power signal of the communication-equivalent power, the power receiving apparatus 200 maintains the communication state.

In step S809, the control unit 105 controls the power transmission unit 101 to the power level for power supply. Since the communication switch 104*b* is turned off in step S807, even if the power level of the alternating current power signal output from the power transmission unit 101 is increased in step S809, the alternating current power signal does not negatively affect the communication unit 102.

In step S810, the control unit 105 determines whether the power transmission period has ended. A criterion for the determination by the control unit 105 as to whether the power transmission period has ended is similar to the examples described above with reference to FIGS. 5 and 7.

In step S811, the control unit 105 determines whether the power transmission processing needs to continue. If the control unit 105 determines that the power transmission processing does not need to continue (NO in step S811), the processing proceeds to step S812. In step S812, the control unit 105 controls the power transmission unit 101 to stop outputting the alternating current power signal. Consequently, the emission of the alternating current power signal from the power transmission antenna 106 toward the external power receiving apparatus 200 is stopped. In step S813, the control unit 105 turns off the power transmission switch 104*a*, and the processing illustrated in FIG. 8 ends.

If the power transmission processing is to continue (YES in step S811), the processing proceeds to step S814. In step S814, the control unit 105 controls the power transmission unit 101 to lower the output power from the power for power supply to the communication-equivalent power. In step S815, the control unit 105 detects the antenna terminal voltage of the power transmission antenna 106 from the output of the direct current conversion unit 108*a*. In step S816, the control unit 105 determines whether the detected antenna terminal voltage is less than or equal to a predetermined value. The control unit 105 repeats detection of the antenna terminal voltage (step S815) until the detected antenna terminal voltage is less than or equal to the predetermined value (step S816). The predetermined value is stored in advance in the ROM built in the control unit 105 and is a threshold value indicating that the magnetic flux intensity of the power transmission antenna 106 is weak enough not to negatively affect the communication unit 102. If the antenna terminal voltage becomes less than or equal to the predetermined value (YES in step S816), the processing proceeds to step S817.

In step S817, the control unit 105 controls the communication unit 102 to output the communication carrier. In step S818, the control unit 105 turns on the communication switch 104*b*. Consequently, the communication carrier is externally emitted from the communication antenna 107. At this time, the alternating current power signal of the communication-equivalent power is also externally emitted from the power transmission antenna 106, so the combined power of the alternating current power signal and the communication signal is externally emitted from the power transmitting apparatus 100. Thus, in step S818, while the communication switch 104*b* is turned on, the control unit 105 controls the power of the alternating current power signal output from the power transmission antenna 106 to a weaker level than the communication-equivalent power.

In step S819, the control unit 105 turns off the power transmission switch 104*a*, and the processing proceeds to step S820. In step S820, the control unit 105 controls the power transmission unit 101 to stop outputting the alternating current power signal. Consequently, external emission of the alternating current power signal from the power transmission antenna 106 is stopped. Following step S820, the processing returns to step S802, and step S802 and subsequent steps are repeated. In step S802, the control unit 105 controls the communication unit 102 to transmit a communication start command for the power receiving apparatus 200.

By the processing in steps S817 to S820, the communication carrier is prevented from being interrupted at the time of the switching from power transmission to communication.

If the transmission processing does not need to continue (NO in step S804), then in step S821, the control unit 105 controls the communication unit 102 to stop outputting the communication carrier. In step S822, the control unit 105 turns off the communication switch 104*b*, and the control processing illustrated in FIG. 8 is ends.

By the switching control described above with reference to FIG. 8, application of overvoltage, etc. to the communication unit 102 can be prevented. By the processing (steps S815 to S818) to switch from power transmission to communication according to a result of the detection of the antenna terminal voltage of the power transmission antenna 106, application of overvoltage, etc. to the communication unit 102 can reliably be prevented at the time of the switching from power transmission to communication. At the time of the switching control between communication and power transmission, because the communication power from the power transmitting apparatus 100 is not interrupted, it becomes possible that the state of the communication unit of the power receiving apparatus 200 is not to be initialized.

At the time of the switching control between communication and power transmission, the state of the communication unit of the power receiving apparatus 200 is not initialized so that initialization processing in each communication processing time becomes unnecessary, whereby the time needed for the communication can be shortened. However, there is a possibility that the states of the power transmitting apparatus 100 and the power receiving apparatus 200 that are respectively recognized by the power receiving apparatus 200 and the power transmitting apparatus 100 become inconsistent. If such a possibility is detected, the control unit 105 can start an initialization process for the communication with the power receiving apparatus 200. For example, the power transmitting apparatus 100 stops the communication carrier and then restarts from an initial operation so that the power transmitting apparatus 100 can communicate with the power receiving apparatus 200. Specifically, in a situation in which the power receiving apparatus 200 can receive sufficient (communication carrier)

power, and if the communication inconsistency is less likely to occur, as in the third exemplary embodiment, it is desirable to maintain the communication carrier power even at the time of the switching control between communication and power transmission. In a case where the (communication carrier) power received by the power receiving apparatus 200 is unstable, as in the first and second exemplary embodiments, it is desirable to perform control to interrupt the communication carrier power at the time of the switching control between communication and power transmission.

Figure 9:
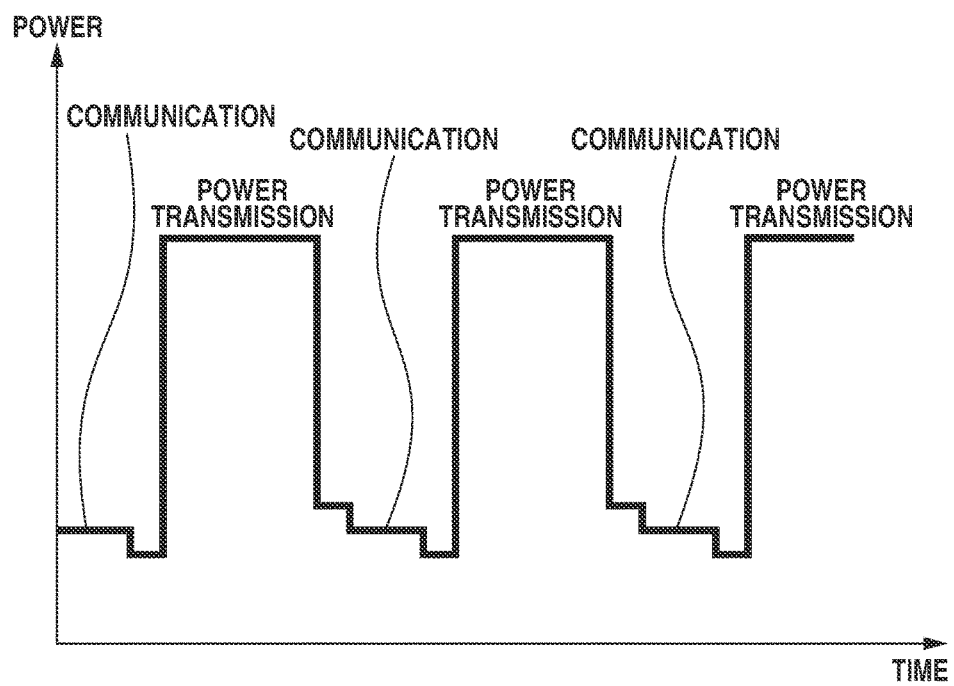
FIG. 9 is a diagram illustrating a timing chart of communication and power transmission by the control illustrated in FIGS. 8A and 8B.

FIG. 9 is a timing chart of power transmission and communication that corresponds to the control illustrated in FIG. 8. The abscissa axis represents time, and the ordinate axis represents power.

While the foregoing describes the exemplary embodiments in which power is contactlessly transmitted by magnetic coupling or electromagnetic induction produced by the power transmission antenna and the power reception coil, contactless power transmission can also be realized by electric field coupling produced by opposite electrodes that are respectively provided to the power transmitting apparatus and the power receiving apparatus. The contactless power transmission realized by such electric field coupling is also encompassed within the scope of the aspect of the invention.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While aspects of the present invention have been described with reference to exemplary embodiments, it is to be understood that the aspects of the invention are not limited to the disclosed exemplary embodiments. The scope of the following claims is to be accorded the broadest interpretation so as to encompass all such modifications and equivalent structures and functions.

This application claims the benefit of Japanese Patent Application No. 2015-208836, filed Oct. 23, 2015, which is hereby incorporated by reference herein in its entirety.

What is claimed is:

1. A power supplying apparatus comprising:
a power supplying unit configured to contactlessly supply power to a power receiving apparatus;
a communication unit configured to wirelessly communicate with the power receiving apparatus; and
a control unit configured to control the supply of power by the power supplying unit and the communication by the communication unit such that the supply of power and the communication are exclusively executed,
wherein, in a case where the control unit performs control such that the communication is executed after the supply of power is executed, the control unit determines whether or not output power from the power supplying unit is less than or equal to a predetermined value;
wherein, in a case where it is determined by the control unit that the output power from the power supplying unit is not less than or equal to the predetermined value, the control unit disables the communication unit, and
wherein, in a case where it is determined by the control unit that the output power from the power supplying unit is less than or equal to the predetermined value, the control unit enables the communication unit.

2. The power supplying apparatus according to claim 1, wherein in a case where the control unit performs control such that the supply of power is executed after the communication is executed, the control unit executes the supply of power after disabling the communication unit.

3. The power supplying apparatus according to claim 1, wherein the control unit stops output of the power supplying unit while the communication with the power receiving apparatus is performed by the communication unit.

4. The power supplying apparatus according to claim 1, wherein at a time of switching from the supply of power to the communication, the control unit controls the output power of the power supplying unit to a predetermined value or less before enabling the communication unit.

5. The power supplying apparatus according to claim 1, further comprising a first antenna and a second antenna,
wherein the power supplying unit contactlessly supplies power to the power receiving apparatus using the first antenna, and
wherein the communication unit wirelessly communicates with the power receiving apparatus using the second antenna.

6. The power supplying apparatus according to claim 5, wherein the second antenna is located in a position within a power supply range of the first antenna.

7. The power supplying apparatus according to claim 1, wherein in a case where the control unit performs control such that the supply of power is executed after the communication is executed, the control unit does not start the supply of power until output from the communication unit becomes less than or equal to a second value.

8. The power supplying apparatus according to claim 7, wherein the second value is less than the predetermined value.

9. The power supplying apparatus according to claim 1, wherein the control unit performs control such that the supply of power and the wireless communication are repeatedly executed exclusively and alternately.

10. A method of controlling a power supplying apparatus including a power supplying unit configured to contactlessly supply power to a power receiving apparatus and a communication unit configured to wirelessly communicate with the power receiving apparatus, the method comprising:

controlling the supply of power by the power supplying unit and the communication by the communication unit such that the supply of power and the communication are exclusively executed, wherein, in a case where the controlling performs control such that the communication is executed after the supply of power is executed, the controlling determines whether or not output power from the power supplying unit is less than or equal to a predetermined value;

wherein, in a case where it is determined that the output power from the power supplying unit is not less than or equal to the predetermined value, the controlling disables the communication unit, di, and wherein, in a case where it is determined that the output power from the power supplying unit is less than or equal to a predetermined value, the controlling enables the communication unit.

11. A non-transitory storage medium storing computer executable instructions that cause a power supplying apparatus including a power supplying unit configured to contactlessly supply power to a power receiving apparatus and a communication unit configured to wirelessly communicate with the power receiving apparatus to execute a method, the method comprising:

controlling the supply of power by the power supplying unit and the communication by the communication unit such that the supply of power and the communication are exclusively executed, wherein, in a case where the controlling performs control such that the communication is executed after the supply of power is executed, the controlling determines whether or not output power from the power supplying unit is less than or equal to a predetermined value, wherein, in a case where it is determined that the output power from the power supplying unit is not less than or equal to the predetermined value, the controlling disables the communication unit, and wherein, in a case where it is determined that the output power from the power supplying unit is less than or equal to a predetermined value, the controlling enables the communication unit.

12. The method according to claim 10, wherein in a case where the controlling performs control such that the supply of power is executed after the communication is executed, the controlling executes the supply of power after disabling the communication unit.

13. The method according to claim 10, wherein the controlling stops output of the power supplying unit while the communication with the power receiving apparatus is performed by the communication unit.

14. The method according to claim 10, wherein at a time of switching from the supply of power to the communication, the controlling controls the output power of the power supplying unit to a predetermined value or less before enabling the communication unit.

15. The method according to claim 10,
wherein the power supply apparatus comprises a first antenna and a second antenna,
wherein the power supplying unit contactlessly supplies power to the power receiving apparatus using the first antenna, and
wherein the communication unit wirelessly communicates with the power receiving apparatus using the second antenna.

16. The non-transitory storage medium according to claim 11, wherein in a case where the controlling performs control such that the supply of power is executed after the communication is executed, the controlling executes the supply of power after disabling the communication unit.

17. The non-transitory storage medium according to claim 11, wherein the controlling stops output of the power supplying unit while the communication with the power receiving apparatus is performed by the communication unit.

18. The non-transitory storage medium according to claim 11, wherein at a time of switching from the supply of power to the communication, the controlling controls the output power of the power supplying unit to a predetermined value or less before enabling the communication unit.

19. The non-transitory storage medium according to claim 11,
wherein the power supply apparatus comprises a first antenna and a second antenna,
wherein the power supplying unit contactlessly supplies power to the power receiving apparatus using the first antenna, and
wherein the communication unit wirelessly communicates with the power receiving apparatus using the second antenna.

* * * * *